(12) United States Patent
Väänänen (10) Patent No.: US 8,611,863 B2
(45) Date of Patent: Dec. 17, 2013

(54) INSTANT VIDEO AND VOICEMAIL MESSAGING METHOD AND MEANS

(75) Inventor: Mikko Kalervo Väänänen, Helsinki (FI)

(73) Assignee: Dot Assets No. 14 LLC, Wilmington, DE (US)

( * ) Notice: Subject to any disclaimer, the term of this patent is extended or adjusted under 35 U.S.C. 154(b) by 155 days.

(21) Appl. No.: 13/161,887

(22) Filed: Jun. 16, 2011

(65) Prior Publication Data

US 2011/0294469 A1    Dec. 1, 2011

Related U.S. Application Data

(63) Continuation of application No. 12/109,770, filed on Apr. 25, 2008, now Pat. No. Re. 42,476.

(30) Foreign Application Priority Data

Aug. 21, 2000    (FI) ...................................... 20001838

(51) Int. Cl.
H04M 11/00    (2006.01)

(52) U.S. Cl.
USPC ..... 455/412.1; 455/413; 455/466; 379/88.13; 379/88.26

(58) Field of Classification Search
USPC .............. 379/88.13, 88.24, 93.28; 455/412.1, 455/413, 550.1, 466; 709/201, 203, 206
See application file for complete search history.

(56) References Cited

U.S. PATENT DOCUMENTS

| 5,239,679 A | 8/1993 | Murai |
| 5,742,666 A | 4/1998 | Alpert |
| 5,742,905 A | 4/1998 | Pepe et al. |
| 5,950,123 A | 9/1999 | Schwelb et al. |
| 6,032,039 A | 2/2000 | Kaplan |
| 6,038,199 A | 3/2000 | Pawlowski et al. |
| 6,058,303 A * | 5/2000 | .ANG.strom et al. ........ 455/413 |
| 6,112,233 A | 8/2000 | Xu |
| 6,138,158 A * | 10/2000 | Boyle et al. .................. 709/225 |
| 6,252,517 B1 | 6/2001 | Parvulescu et al. |

(Continued)

FOREIGN PATENT DOCUMENTS

| DE | 19 58 126 | 5/1971 |
| EP | 0 845 894 | 6/1998 |

(Continued)

OTHER PUBLICATIONS

Non-Final Office Action on U.S. Appl. 13/297,643, mailed Mar. 9, 2012.

(Continued)

*Primary Examiner* — Binh Tieu (57) ABSTRACT

The invention relates to the field of instant messaging. More specifically the invention relates to a server centric method and unit for instant voice and video mail messaging. Even more particularly the invention relates to voicemail messaging with mobile terminals. The inventive methods and units under study allow faster voice messaging and enable similar, but not identical audio/video message "ping ball". The sending of voicemail in accordance with the invention is instantaneous and involves no different telephone numbers for the sender to remember. The reception of messages is always instantaneous, provided the recipient is available, and only if not available, may the delivery of the messages be delayed.

16 Claims, 7 Drawing Sheets

(56) References Cited

U.S. PATENT DOCUMENTS

| | | | |
|---|---|---|---|
| 6,266,340 B1 | 7/2001 | Pickett et al. | |
| 6,351,523 B1 | 2/2002 | Detlef | |
| 6,385,306 B1* | 5/2002 | Baxter, Jr. | 379/88.13 |
| 6,400,958 B1 | 6/2002 | Isomursu et al. | |
| 6,442,242 B1 | 8/2002 | McAllister et al. | |
| 6,466,654 B1 | 10/2002 | Cooper et al. | |
| 6,507,643 B1* | 1/2003 | Groner | 379/88.14 |
| 6,553,220 B1* | 4/2003 | Marks | 455/413 |
| 6,563,912 B1 | 5/2003 | Dorfman et al. | |
| 6,611,516 B1 | 8/2003 | Pirkola et al. | |
| 6,643,034 B1* | 11/2003 | Gordon et al. | 358/434 |
| 6,650,901 B1 | 11/2003 | Schuster et al. | |
| 6,725,256 B1* | 4/2004 | Albal et al. | 709/206 |
| 6,747,989 B1 | 6/2004 | Sevanto | |
| 6,757,531 B1* | 6/2004 | Haaramo et al. | 455/414.1 |
| 6,763,226 B1 | 7/2004 | McZeal, Jr. | |
| 6,772,233 B2 | 8/2004 | Iida et al. | |
| 6,826,407 B1 | 11/2004 | Helferich | |
| 6,826,609 B1* | 11/2004 | Smith et al. | 709/225 |
| 6,842,772 B1 | 1/2005 | Delaney et al. | |
| 6,907,113 B1 | 6/2005 | Holm et al. | |
| 6,978,127 B1 | 12/2005 | Bulthuis et al. | |
| 7,289,792 B1 | 10/2007 | Turunen | |
| 2001/0005675 A1 | 6/2001 | Aho | |
| 2001/0034767 A1 | 10/2001 | Aho | |
| 2001/0039589 A1 | 11/2001 | Aho et al. | |
| 2002/0086662 A1 | 7/2002 | Culliss | |
| 2002/0152266 A1 | 10/2002 | Burfeind et al. | |
| 2003/0063580 A1 | 4/2003 | Pond | |
| 2004/0259531 A1 | 12/2004 | Wood et al. | |
| 2005/0020250 A1 | 1/2005 | Chaddha et al. | |
| 2005/0287993 A1 | 12/2005 | Gogic | |
| 2006/0003745 A1 | 1/2006 | Gogic | |

FOREIGN PATENT DOCUMENTS

| | | |
|---|---|---|
| EP | 1 033 861 | 9/2000 |
| EP | 1 056 268 | 8/2002 |
| EP | 07 946 550 | 12/2004 |
| EP | 1 429 511 | 4/2007 |
| FI | 108982 | 4/2002 |
| JP | 08-032618 | 2/1996 |
| JP | 08-125603 | 5/1996 |
| JP | 11-275205 | 10/1999 |
| WO | WO-97/41654 | 11/1997 |
| WO | WO-98/44709 | 10/1998 |
| WO | WO-99/51048 | 10/1999 |
| WO | WO-99/66746 | 12/1999 |
| WO | WO-00/02367 | 1/2000 |
| WO | WO-00/30374 | 5/2000 |
| WO | WO-00/38340 | 6/2000 |

OTHER PUBLICATIONS

Final Office Action on U.S. Appl. No. 13/297,643, mailed Aug. 16, 2012.
"User's Manual", Nokia Mobile Phones, No. 9357168, Issue 3 EN, 1999.
C. Zhu, "RIP Payload Format for H.263 Video Streams", Intel Corporation, ftp://ftp.isi.edu, Sep. 1997.
Chawea et al., "Transmission of Streaming Video Over an EGPRS Wireless Network", New York, NY, V. 1 (2000), pp. 275-278.
Communication for EP application No. 01 958 126.3, dated Dec. 17, 2007.
Communication for EP application No. 01 958 126.3, dated Dec. 30, 2005.
Communication for EP application No. 01 958 126.3, dated Feb. 13, 2007.
Communication for EP application No. 01 958 126.3, dated Jun. 2, 2008.
Communication for EP application No. 01 958 126.3, dated Jun. 8, 2005.
Communication for EP application No. 01 958 126.3, dated May 29, 2006.
Communication for EP application No. 01 960 808.2, dated Sep. 29, 2006.
Decision of the Board of Appeal of the national Board of Patents and Registration of Finland for Patent No. 110297, Issued in Helsinki on Dec. 4, 2007.
Final Rejection Decision on Japanese Application 2002-522210, dispatched Feb. 1, 2011 (with English translation).
Finnish Search Report for Application 20001838, dated Nov. 2, 2001.
First Office Action for Chinese application No. 01816921, issued on Oct. 28, 2005.
Gruhl et al., "A Demonstrator for Real-Time Multimedia Sessions Over 3rd Generation Wireless Networks", New York, NY, V. 2 (2000), pp. 959-962.
Harry Newton, "Newton's Telecom Dictionary", New York, Mar. 1998, pp. 526-529.
Index of /NOKIA/INSTALL.1, pp. 1-9, printed Oct. 29, 2004.
International Preliminary Examination Report for PCT/FI2001/00701 completed on Dec. 11, 2002.
International Preliminary Examination Report for PCT/FI2001/00732, completed on Dec. 11, 2002.
International Search Report for PCT/FI2001/00701 mailed on Nov. 13, 2001.
International Search Report for PCT/FI2001/00732 mailed on Nov. 27, 2001.
Internet Article, "Mr. Facility's Guide to: How to Get Audio Over the Web", V.1.2, Oct. 1, 1996, http://www.ducksbreath.com/ducks/warmup/tips.htm, pp. 1-13.
Internet article, "Nokia Introduces the World's first High-Speed Data Terminal for Wireless Networks", Nokia Connecting People, Jun. 21, 1999, http://press.nokia.com/PR/199906/776767.sub.—5.html, pp. 1-2.
Internet Article, "Welcome to this NOKIA9000/9110 Page", https://anten/fol/n1/nokia/nokia/html, 5 pages, printed Apr. 27, 2004.
Internet Article, https://xesife001.nokia.com/exchange/EXT-PWF.Patent-Agency/Inbox/FW:%20%20Suinn, 15 pgs., printed May 25, 2004.
Jarkko Sevanto, "Multimedia Messaging Service for GPRS and UMTS", New Orleans, LA, V. 3, 1999, pp. 1422-1426.
Martin H. Weik, DSC., "Communications Standard Dictionary", Second Edition, Dynamic Systems, Inc., Resont, Virginia, 1989, pp. 768-769.
Mikko Vaananen, "Memo Regarding 'International Application No. PCT/FI2001/00701'", Helsinki, Finland, May 2002.
Nokia Mobile Phones, User's Manual, No. 9357168, Issue 3 EN, 1999.
Non-Final Office Action on U.S. Appl. No. 11/730,209, mailed Mar. 2, 2011.
Non-final Office Action on U.S. Appl. No. 12/109,770, mailed Apr. 21, 2010.
Notice of Allowance on U.S. Appl. No. 11/730,209, mailed Aug. 18, 2011.
Notice of Allowance on U.S. Appl. No. 12/109,770, mailed Jan. 31, 2011.
Office Action for Japanese Application 2002-522210, issued Jul. 6, 2010.
Non-Final Office Action on U.S. Appl. No. 12/109,770, mailed Jul. 16, 2009.
Office Action on U.S. Appl. No. 11/730,209, mailed May 24, 2010.
Office Action on U.S. Appl. No. 11/730,209, mailed Nov. 13, 2009.
Non-Final Office Action on U.S. Appl. No. 12/109,770, mailed Mar. 4, 2009.
Press Releases "Nokia introduces its second generation communicator—The pocket-sized Nokia 9110 Communicator combines an ultimate mobile office with a superb phone", Internet—http://press.nokia.com, 1998.
RealNetworks Inc., "Delivering REALAUDIO.RTM. or REAL VIDEO.RTM. from a Web Server", RealNetworks Technical Blueprint Series, Seattle, WA, 1998.
Schulztinne et al., "RTP: A Transport Protocol for Real-Time Applications", Audio-Video Transport Working Group; GMD Focus; Precept Software,; Xerox Palo Alto Research Center; Lawrence Berkeley National Laboratory, ftp://ftp.isi.edu, Jan. 1996.

(56) References Cited

OTHER PUBLICATIONS

Written Opinion # 1 for PCT/FI2001/00701 mailed on Jul. 10, 2002.
Written Opinion # 2 for PCT/FI2001/00701 mailed on Nov. 19, 2002.
Written Opinion for PCT/FI2001/00732, mailed on Aug. 22, 2002.
Written Opinion for PCT/FI2001/00732, mailed on Nov. 19, 2002.
Notice of Allowance on U.S. Appl. No. 13/297,643, mailed Nov. 19, 2012.
European Search Report Issued on European Application 09153558.3, mailed Jan. 16, 2013.

* cited by examiner

INSTANT VIDEO AND VOICEMAIL MESSAGING METHOD AND MEANS

CROSS-REFERENCE TO RELATED PATENT APPLICATIONS

This application is a Continuation of U.S. Reissue application Ser. No. 12/109,770, filed Apr. 25, 2008, now U.S. Pat. No. Re. 42476, which is a Reissue of U.S. application Ser. No. 10/344,994, filed Jul. 10, 2003, now U.S. Pat. No. 7,113,767, which is a National Stage of PCT/FI2001/000732, filed Aug. 20, 2001, which claims benefit to Finland Application 20001838, filed Aug. 21, 2000, including the specification, drawings, claims and abstract, all of which are incorporated herein by reference in their entirety.

FIELD OF THE INVENTION

The invention relates to the field of instant messaging. More specifically the invention relates to a server centric method and means for instant voice and video mail messaging. Even more particularly the invention relates voicemail messaging with mobile terminals.

BACKGROUND

For further prior art to this invention, we wish to submit WO 01/54387 A1, Nguyen. This document discloses a method where: "A unique telephone number and extension are associated with each (1) one of a plurality of subscribers (105). The telephone number is also associated with a remote access point of presence (RAPP) (120). Messages are left for subscribers by establishing a phone call to the phone number associated therewith. The phone call is received at a RAPP (120). The RAPP (120) receives the voice message, digitises and pocketsize the voice message, and transmits the message over a packet network (130) to a store and forward messaging system (125). The store and forward messaging system stores the message for retrieval. The message can be retrieved by either telephone, a client computer, or a private branch exchange terminal (110)." This document is cited here as reference.

In addition prior art methods in delivering messages include Cellular voicemail and SMS (Short Message Service) messages. SMS messages are text-based messages, which are delivered to the terminal directly as a first priority, and stored on the network if delivery is unavailable. With Cellular Voicemail it is possible to call the voicemail box of the recipient, and the recipient of the voicemail may later listen the message.

This prior art has several disadvantages in contrast with the invention in the priority document and this inventive method under study based on the priority document. SMS messages are restricted to text which is harder to input than voice by speech. SMS messages are therefore tedious to the sender. Cellular voicemail is both tedious to send and receive. In order to send voicemail, the sender has to know the telephone number of the voicemail box of the recipient, which is typically different from the phone number, or wait for the voicemail box to connect to the original telephone number when the recipient is not available. In order to receive voicemail, the recipient needs to retrieve the message from the network, because the message is not delivered instantly to him.

SUMMARY OF THE INVENTION

The method under study is far faster and enables similar, but not identical audio/video message "ping ball" as described in the priority document. The sending of voicemail in accordance with the invention is instantaneous and involves no different telephone numbers for the sender to remember. The reception of messages is always instantaneous, provided the recipient is available, and only if not available, may the delivery of the messages be delayed.

The aforementioned advantages are best realised with an exemplary embodiment of the invention, in which the user has a software application running on his subscriber terminal. The user chooses a recipient for a voice- or video mail from the contacts book of the terminal by pressing a button. The terminal forms a data connection to a server or dials a telephone connection to a server, which typically has a low latency i.e. the connection to the server is formed fast. The subscriber terminal sends the contact information of the recipient to the server. The subscriber terminal, the server or both indicate to the user that the recording of the message is begun or may be started. The recording is displayed and/or dictated down to phone line to the server or through a packet switched connection to the server. The server stores the recording typically in MP3-, WAV- or RealSystem Secure, u-law, A-law, PCM or ADPCM or the like format to a database. There is typically a DSP circuit that digitises the recording to a data file. Alternatively tape recording may be used. The server inspects the phone number, IP address or other contact directory of the recipient, and routes the message file, or a copy of it, to a server in close proximity in the SFSN (Store and Forward Server Network). This server, or alternatively the original server, then establishes a communication connection to the recipient(s). The connection is typically established by a phone call to the recipient, and when the recipient answers the message is played to the recipient. Prefixes and postfixes may be attached to the message such as: "Message of Ms. Vilma Vaananen" MESSAGE "The message of Vilma Vaananen was brought to you by OPERATOR."

A video and/or voicemail messaging method, comprising at least one subscriber terminal and at least one server, in accordance with the invention is characterised by the steps of, choosing at least one message recipient or a group, forming a communications connection to at least one server, recording at least one voice/video message to at least one server via at least one established communications connection, transferring at least one contact directory of at least one recipient to at least one server, disconnecting the connection to at least one server, at least one server relays the message to at least one recipient terminal via telephony network or the Internet.

A video- and/or voicemail messaging method, comprising at least one subscriber terminal and at least one server, in accordance with the invention is characterised by the steps of, choosing at least one message recipient or a group, forming a communications connection to at least one server, recording at least one voice/video message to at least one server via at least one established communications connection, transferring at least one contact directory of at least one recipient to at least one server, disconnecting the connection to at least one server, transferring at least one said message and at least one said contact directory to a Store and Forward Server Network (SFSN), at least one server in the SFSN or the original server relays at least one message to at least one recipient terminal device through the Internet or the telephony network, A video- and/or voicemail messaging server, comprising at least one media player and/or a DSP and at least one data storage means and communications connections in and out of the telephony network, SFSN and/or the Internet in accordance with the invention is characterised in that, a recording is arranged to be made to the media player and/or DSP through an established communications connection from a subscriber terminal, a capture of recipient contact information and/or other message attributes from the subscriber terminal is arranged on the server, and the contact information is arranged to be stored to the storage means, at least one media player and/or DSP is arranged to store the recording to a data file, at least one data file is arranged to be stored on the data storage means, at least one data file, or at least one copy of the data file is arranged to be sent to another server in the SFSN and/or a connection is arranged to be formed to at least one recipient.

A video- and/or voicemail messaging subscriber terminal in accordance with the invention is characterised in that, the user is arranged with the possibility to select at least one recipient, at least one communications connection is arranged to be formed to the sewer upon selection of at least one recipient, the recipient contact information is arranged to be sent to the server, the terminal is arranged to relay at least one video and/or audio signal to the server, the communication connection is arranged to be disconnected upon a dedicated action or upon the fulfillment of dedicated criteria.

BRIEF DESCRIPTION OF THE DRAWINGS

In the following the invention will be described in greater detail with reference to exemplary embodiments in accordance with the accompanying drawings, in which FIG. 1 demonstrates the principal method 10 of the invention as a flow diagram.

DETAILED DESCRIPTION OF THE PREFERRED EMBODIMENTS

Figure 1:
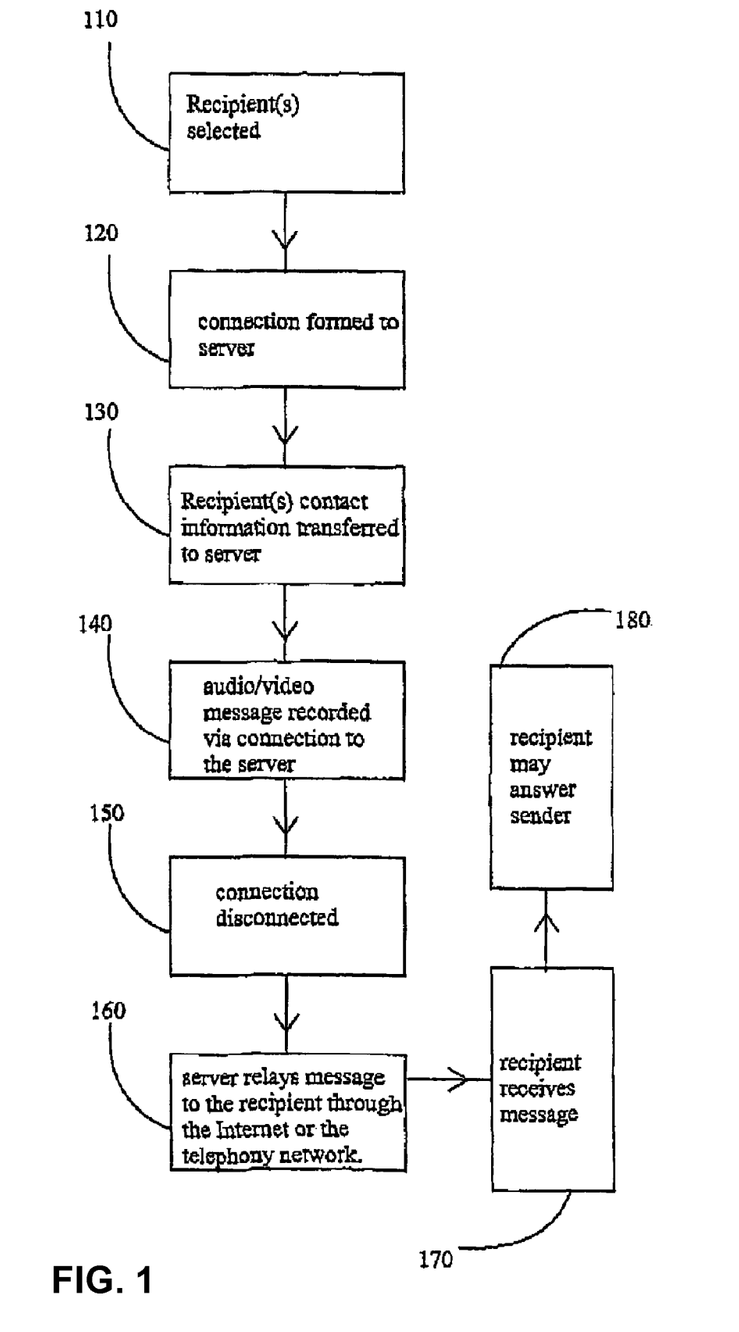

In phase 110 of FIG. 1 the message recipient is chosen. The recipient may be chosen by labeling the recipient with a pointer from the "contacts" file of the terminal device, the recipient may be chosen by speech recognition, a dedicated keyboard accelerator, hot key, dedicated key or any combinations or permutations of these in some embodiments. Several recipients or a group may also be selected in some embodiments. A simple press of a button may also be used to select at least one recipient. The terminal device is typically a computer, palmtop, laptop, or a mobile station, mobile phone, pager or any wired or wireless information device. In some embodiments the terminal features Windows-, Windows NT-, Epoc-, Windows CE-, Unix-, Linux-, OS/2, Symbian, Epoc, PalmOS, Pocket PC, GEOS, MS-Stinger and/or Sybase or the like operating system or software.

In phase 120 a packet switched or a circuit switched connection is established to the server. In some embodiments the subscriber terminal intercepts a selected recipient(s) contact directory, and forms a communications connection to the server. The connection is typically a SS7-, GSM-, H323-, HTTP-, GSM-data, IP-RAN-, UMTS-, WAP-, Teldesic-, Inmarsat-, Iridium-, GPRS-, CDMA-data-, WCDMA-data, HTTP-, H323-, SMS-, MMS-, email-LAN-, TCP/IP-, imode-, Globalstar- and/or WLAN-connection in some embodiments.

In phase 130 the recipient contact information of at least one recipient or a recipient group is transferred to the server via the connection or otherwise. The recipient contact information may comprise the telephone number, static or dynamic IP-address, ISDN-number, MSISDN-number, email, SIP (Session Initiation Protocol) ID of the recipient, or any other directory information. The subscriber terminal may translate directory information from one type to the next depending on the requirements. For example, when the network is packet switched, a telephone number may be converted to an IP-address in some embodiments. In some embodiments the directory information of the sender, such as Caller ID, telephone number, IP address or the like is transferred to the server as well. The directory information of the recipients, sender or other message attributes are transferred via the established communications channel, or through a separate communications or messaging channel. For example, if the connection is a phone call, DTMF tones, SMS messages, USSD messages or the like may be used to communicate the said information. If the connection is an IP connection, usually this same connection is used to convey the said information.

In phase 140 the voice/video message is recorded in packet switched or circuit switched format, but other formats are also possible in some embodiments. Consequently, the recording is written to a data file. The data file is typically an MP3-, WAV- or RealSystem Secure data file in some preferable embodiments. In some alternative embodiments the message may be recorded on tape. In some embodiments phase 140 may be executed prior to 130, or both may be executed concurrently.

In phase 150 the connection is disconnected. The connection is preferably disconnected when the message has been completed. The connection may be disconnected by the user by a dedication action, such as pressing a button or a like action. The fulfillment of a predefined time limit may disconnect the connection, as well as Voice Activity Detection. If the user is silent, then either the terminal may conclude the message is completed, and disconnect the connection. Also the release or press of a button may be used to disconnect the connection.

In phase 160 the server relays the message to the recipient(s) through the Internet or the telephony network. If the recipient terminal is capable of receiving the data file, which means typically having a packet switched access to the recipient device, the message may be sent with an packet switched connection, like IP, through the Internet, or through some other closed network. If the receiving terminal is a circuit switched device, for instance a telephone of any kind, the server may call the number and once answered by a recipient or a voicemail box plays the message as playback down the phone line. In some embodiments of the invention, a special prefix and postfix may be stored to the server, which in some embodiments are associated and recognized on the basis of the sender's directory information, the SIM or the mobile station memory, and is played prior to the recording in the data file or after it. The prefix and/or postfix could play for instance: "In the following you will hear a message from Ms. Vilma Vaananen." MESSAGE "This completed the message of Vilma Vaananen." In some preferable embodiments the sender is displayed on the recipient terminal screen.

When the recipient receives the message in phase 170, some indication of this is typically captured. The recipient is asked in the postfix whether he would like to hear the message again, whether he understood the message, whether he is the person the message was intended to or any other attributes related to the status of the message may be queried. The user may indicate his preferences by pressing e.g. a dedicated button. This dedicated action will signal the server on the status of a certain message with respect to a certain recipient.

If the recipient is unavailable, the message may be stored on the server for some time, and attempts to deliver the message may be taken at timely intervals. In some embodiments the message is rerouted to an alternative directory, such as email or voicemail box if the user is unavailable. The server may send a notification to the sender concerning which messages got delivered, which did not, how long will the messages remain in the network and other related important delivery status information relating to the delivery of said messages or attributed given by the recipient(s).

In phase 180 the recipient may answer sender directly. This may be done by pressing a button after the data file has been played and dictating another data file or another dictation to tape, which will be sent to the initial sender as a reply. The reply may be delivered in accordance with the inventive methods 10, 20 and/or 30 in some embodiments. In some further embodiments it is also possible to forward messages to other recipients or third parties. The data file is typically an MP3-, WAV- or RealSystem Secure data file.

Figure 2:
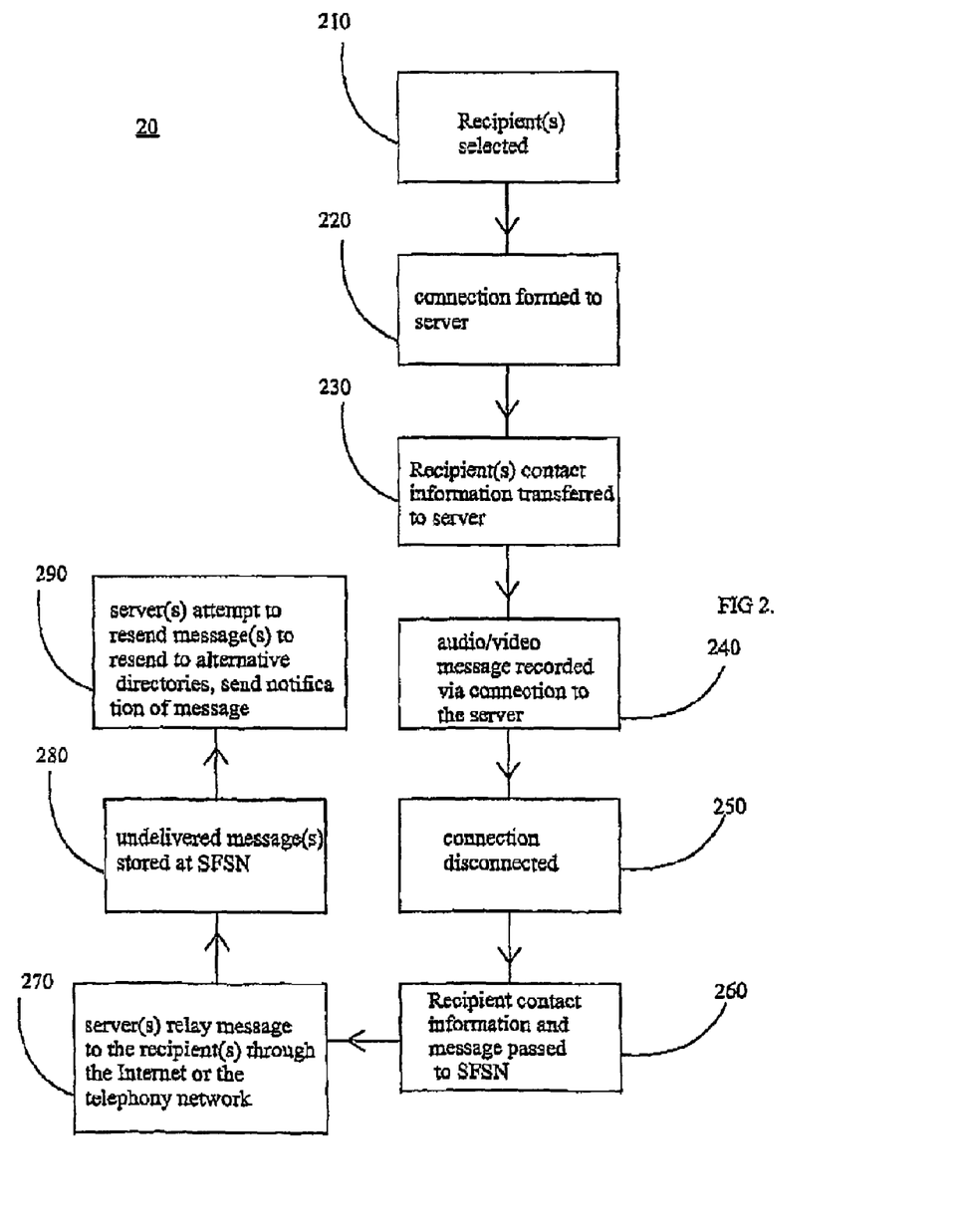
FIG. 2 demonstrates a more scalable messaging method 20 in accordance with the invention.

FIG. 2 displays a more scalable messaging method in accordance with the invention. In phase 210 of FIG. 2 at least one recipient is chosen. In phase 220 the subscriber terminal forms a connection to the server. Recipient contact information is typically transferred in phase 230, and the recording of the said video/audio message is done in phase 240. The connection is disconnected in phase 250.

Before phase 260 the server establishes, whether it should deliver the message to the recipient directly as in phase 160 of method 10, or forward it to other servers in a Store and Forward Server Network associated with the original server. In a sealable network architecture, phase 260 is typically proceeded with and both the recipient contact information and the message are passed onto the SFSN. In some embodiments where several recipients or at least one group exists, the message may be relayed to some recipients by the original server and to some by the SFSN. The SFSN is typically a network of servers linked together through the Internet, telephony network, a Virtual Private Network (VPN), or some other communications or signalling network. The connections in the SFSN may be TCP/IP-, IP-, UDP-, HTTP, H323-, and/or FTC- in some embodiments.

In phase 270 the servers in the SFSN typically deliver a copy of the message to a server near a recipient, and this server attempts to relay the message to the said recipient. The server may attempt to form a packet switched connection to one, some or all of the recipients terminals, attempt to dial a circuit switched telephone connection and play the message as playback down the phone line, or email the message to the recipient. In phase 280 the messages that were undelivered are stored on the SFSN.

In phase 290 some or all of messages that were undelivered in phase 270 are being resent. The server may attempt to resend the message to the same directories or addresses, or it may attempt to reroute the message to an alternative address of the recipient. In some preferable embodiments the server sends a different message, for instance an SMS message, signifying that the message was not delivered and is on the server for later retrieval. The notification message may contain access codes, directory information of the server, such as dial in phone number, URL address, IP address or the like.

In one alternative embodiment, the software in the subscriber terminal has the telephone number of the software stored. Both the telephone number and the current IP-address are given to the server. Telephone numbers and IP-addresses can then be used interchangeably when contact is made between software applications. This results to the effect that information in packet switched format can be readily transmitted to telephone numbers, provided these telephone numbers have a corresponding IP-address.

Figure 3:
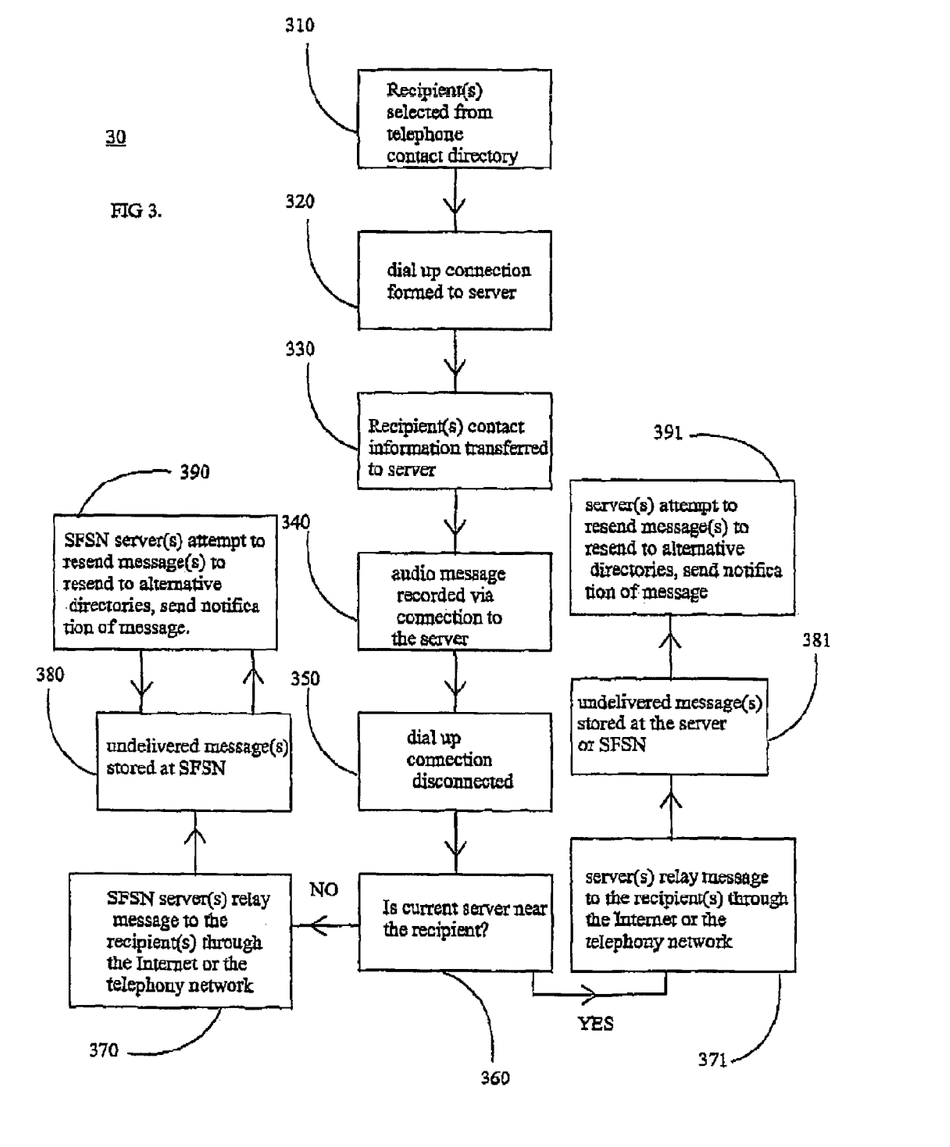
FIG. 3 demonstrates a method applicable to circuit switched networks in accordance with the invention.

In FIG. 3 the method 30 shows an inventive audio/video messaging method which is most applicable to circuit switched communications, i.e. cellular e.g. GSM or CDMA or fixed line e.g. POTS (Pain Old Telephone Service). In phase 310 at least one recipient or a group are selected from the telephone or mobile station memory. The recipient may be chosen by labeling the recipient with a pointer from the "contacts" file of the terminal device, the recipient may be chosen by speech recognition, a dedicated keyboard accelerator, hot key, dedicated key or any combinations or permutations of these in some embodiments. Several recipients or a group may also be selected in some embodiments. A simple press of a button may also be used to select at least one recipient.

In some preferable embodiments the mobile station features SIM Application Toolkit (SAT), Java Virtual Machine or Wireless Telephony Application Interface support WTAI. A special menu e.g. "Voice Messages", or "Instant Voice Messages" or "Uni-directional phone call" menu may be realised in accordance with the invention. The recipient may be selected from this menu, typically on the SIM and/or mobile station memory with the aforementioned methods.

In phase 320 the terminal intercepts the selected recipient telephone number, and dials a telephone number associated with the server.

Once the connection to the server is operational, either the terminal sends or server retrieves the recipient(s) contact directory and the telephone number of the sender or caller ID of the message in phase 330. These telephone numbers may be sent through SS-, USSD-, SMS- or SS7-channels, or as DTMF tones through the connection. The server then records these numbers and translated or modifies them according to some rules or definitions to enable further delivery of the message. Once the relevant information has been signalled between the terminal and the server, either one may indicate to the user that the dictation may begin.

In phase 340 the message is being dictated through the connection and recorded on the server. Consequently, the recording is written to a data file. The data file is typically an MP3-, WAV- or RealSystem Secure, u-law, A-law, PCM or ADPCM data file in some preferable embodiments. In some alternative embodiments the message may be recorded on tape. In some embodiments the process is cancelled if the connection breaks and an error notification indicating this may be sent by SMS.

In phase 350 the dial up connection is disconnected. The connection is preferably disconnected when the message has been completed. The connection may be disconnected by the user by a dedicated action, such as pressing a button or a like action. The fulfilment of a predefined time limit may disconnect the connection, as well as Voice Activity Detection. If the user is silent, then either the terminal may conclude the message completed, and disconnect the connection. Also the release or press of a button may be used to disconnect the connection.

In phase 360 the server examines the message delivery requests. If it is determinable that the recipient is near the server, from the telephone number, country or area code, VLR (Visitor Location Register), HLR (Home Location Register)

or any other source, the server may proceed to phase 371. If the server concludes that reaching the recipient is not feasible or justified according to set criteria, it will proceed to phase 370. Other logical reasons apart from narity, for example cost of terminating connection may determine whether to proceed to 370 or 371, or neither. In extreme circumstances, if the delivery of the message is impossible, the server may delete the message and send a notification to the recipient, for example by SMS or email.

Assume the server proceeded to 371. In this phase the original server calls the numbers of the recipients and once answered by a recipient or a voicemail box plays the message as playback down the phone line. In some embodiments of the invention, a special prefix and postfix may be stored to the server, which in some embodiments are associated and recognized on the basis of the sender's directory information, the SIM or the mobile station memory, and is played prior to the recording in the data file or after it. The prefix and/or postfix could play for instance: "In the following you will hear a message from Ms Vilma Vaananen." MESSAGE "This completed the message of Vilma Vaananen." In some preferable embodiments the sender is displayed on the recipient terminal screen. In some embodiments, the caller ID, the name of the sender or the like is displayed by the Caller ID property of the network, or by a SMS, OTA (Over the Air) or WAP-flash, or SMS broadcast message.

In phase 381 the undelivered messages are stored at the server or in the SFSN. In phase 391 the original server or the SFSN attempts to deliver the message at timely intervals, for example by placing further calls. In some embodiments the message is rerouted to an alternative directory, such as email or voicemail box, or the like if the user is unavailable. Alternatively, the messages could be attempted to send via a packet switched connection as described in FI20001838 of the applicant. The server may send a notification to the sender concerning which messages got delivered, which did not, what was the reason; was the recipient busy, refused the call, in radio shadow, how long will the messages remain in the network and other related important delivery status information relating to the delivery of said messages. In some preferable embodiments the server sends a different message to the recipient, for instance an SMS message, signifying that the message was not delivered and is held on the server for later retrieval. The notification message may contain access codes, directory information of the server, such as dial in phone number, URL address, IP address or the like.

Assume the server proceeded to phase 370. Here the SFSN servers relay the message to the recipients through the Internet or the Telephony network. The call to the recipient is sometimes made from an optimal server in the SFSN. This may be the closest server or the one with the most inexpensive communications connection to the recipient. The choice of the server making contact with a particular recipient is determined by delivery criteria set in the network. When the same message is delivered to various recipients in different locations, copies of the same message may be routed to several different servers, from which the call is made. The message delivery process may be as described in phase 371.

In phase 380, the undelivered messages are stored on the SFSN. The messages may be stored for a period of time, before proceeding to phase 390. In some alternative embodiments there is an iteration loop between phases 380 and 390. In some cases several attempts to call a recipient are made, and a notification or rerouting of the message are taken after some attempts have failed. Any SFSN server may send a notification to the sender concerning which messages got delivered, which did not, how long will the messages remain in the network and other related important delivery status information relating to the delivery of said messages.

The recipients may also answer sender directly, upon reception of a message. This may be done by pressing a button after the data file has been played and dictating another data file or another dictation to tape, which will be sent to the initial sender as a reply. The reply may be delivered in accordance with the inventive methods 10, 20 and/or 30 in some embodiments. In some further embodiments it is also possible to forward messages to other recipients or third parties. The data file is typically an MP3-, WAV- or RealSystem Secure, u-law, A-law, PCM or ADPCM data file.

During, in between or after any of the phases of methods 10, 20, 30, directory lookup may be executed in some preferable embodiments. The telephone number of the recipient is converted to an IP-address in one preferable embodiment. A prior art solution to directory lookup and conversion is presented in my patent application "Telenetwork directory template", FI19992774, which is taken here as reference. Directory lookup is here established as the interchange retrieval and/or comparison of any directory information such as email-, IP-address, URL, ISDN number, MSISDN, phone number or the like to another corresponding email-, IP-address, URL, ISDN number, phone number or the like directory from the network, network server and/or terminal in order to deliver the message to a directory. Especially in cases where the IP-address of the recipient is a dynamic one, the directory lookup is an advantageous feature. In some embodiments where the recipient has a static IP address, the IP-address need not be looked up separately every time. In some preferable embodiments IP-addresses of recipients are stored on the subscriber terminal. In some embodiments only static IP-addresses of recipients are stored.

During, in between or after any of the phases of methods 10, 20, 30, signal barring may be executed in some preferable embodiments. In some embodiments the recipients may decline to receive messages from unwanted parties, for example by setting conditions to their subscriber terminal.

Voice recognition may be employed during, before, in between or after any of the phases of methods 10, 20, 30. In some preferable embodiments, voice recognition is used to convert the dictation into a written email, SMS-, MMS-message or the like.

In some embodiments, at least one subscriber terminal and at least one server form a Virtual Private Network (VPN).

A Regret function or request may be employed during, before, in between or after any of the phases of methods 10, 20, 30 in order to destroy an unwanted intermittent or complete message. It may be sent to the server directly, which will handle the message cancellation on itself or the SFSN, even when it has already been sent. In some embodiments the message is destroyed upon receipt of the regret message on any server, in some embodiments after the receiver has played the message or in some embodiments irrespective of this.

In some embodiments, it is possible to utilize Autoplay upon reception. In this embodiment, the audio/video message is played automatically upon reception of the message. Typically, this means opening the file containing the message, and possibly employing decoding and/or decryption methods in some embodiments. In some embodiments where the message arrives by playback down the phone line, Autoplay is used to automatically answer these phone calls and play the call to the speaker(s) of the terminal. In this embodiment the server typically has to send some indication, signifying to the recipient terminal that it is indeed this message and not any call, in which case Auto answer may be employed.

Charging and/or billing of the message may be realised during before, in between or after any of the phases of methods 10, 20, 30. In some preferable embodiments, the message is billed with a fixed price and has a maximum duration. This way the service provider may estimate the real cost of a message very accurately and charge a premium for the service. This could be realised with a toll free number that has a fixed connection charge for instance. It is also possible to bill the user only after the message has been successfully delivered and notified. This could be realised for example by having everything else free, and charging for the last SMS notification. Alternatively it is possible just to bill the user based on the telephone or Internet connection, for example on a cost per connection minute or on a cost per transmitted or received bit.

The subscriber terminal is typically a mobile station equipped with an Internet connection and/or a telephony network connection. The mobile station typically abides to UMTS-, GSM-, WAP-, Teldesic-, Inmarsat-, Iridium-, GPRS-, CDMA-, HTTP-, H323-, SMS-, MMS-, and/or WCDMA-standards in some preferable embodiments. The subscriber terminal used in the method may also be a PC, PDA, Palm Computer or an Apple Macintosh computer equipped with an Internet connection and/or a telephony network connection in some preferable embodiments. The subscriber terminal in accordance with the invention has typically an operating system like Windows-, Windows NT-, Epoc-, Windows CE-, Unix-, Linux-, OS/2, Symbian, Epoc, PalmOS, Pocket PC, GEOS, Ms-Stinger and/or Sybase. The execution of methods 10, 20, 30 is typically realised with a separate software application operating under the control of those operating systems. Alternatively, the execution of methods 10, 20, 30 may be realised with software that is integrated to any of the above operating systems. In some embodiments the execution of methods 10, 20, 30 and their favourable permutations and further embodiments may be realised by OEM software for mobile stations, modems, computers, radio, SIM cards and/or line cards. In some embodiments the execution of methods 10, 20, 30 may be realised with software that is integrated to any email client software, such as Microsoft Outlook, Outlook Express or the like. In some embodiments the execution of methods 10, 20, 30 may be realised with software that is developed using SAT (SIM Application Toolkit) or WTAI (Wireless Telephony Application Interface) of WAP (Wireless Application Protocol).

Any sent or received messages or their drafts may be saved, forwarded and replied to during, before, in between or after any of the phases of methods 10, 20, 30 on the network servers, on the SFSN or on the terminals or to the voicemail box, email or the like of the party in question.

The communications connections used between the terminals and the servers or in the SFSN are typically compliant with SS7-, GSM-, H323-, HTTP-, GSM-data, IP-RAN-, UMTS-, WAP-, Teldesic-, Inmarsat-, Iridium-, GPRS-, CDMA-data-, WCDMA-data-, HTTP-, H323-, SMS-, MMS-, USSD-, email-LAN-, TCP/IP-, UDP, imode-, Globalstar- and/or WLAN-connections in some embodiments.

The server typically features several incoming sockets for incoming packet switched connections and incoming dial in ports for incoming telephone calls, and features also the outgoing ports and sockets for both connections. In addition the server typically features also a media player and a media recorder both of which may be integrated in some embodiments, alternatively tape recording and/or reproduction may also be used. The server typically also comprises a database and a database management system (DBMS). The recorded media files are stored in the database. The DBMS or any other associated data management logic then directs the files to the media player, provided the server decides to relay the message to the recipient directly, or the DBMS transfers the files to other servers in the SFSN, so that another server in the SFSN may deliver it to a recipient. The database can be any database or data management utility, for example Oracle, Solid, TimesTen, Clustra, Informix, Sybase, IBM D2, or any other database or data management system.

Figure 4:
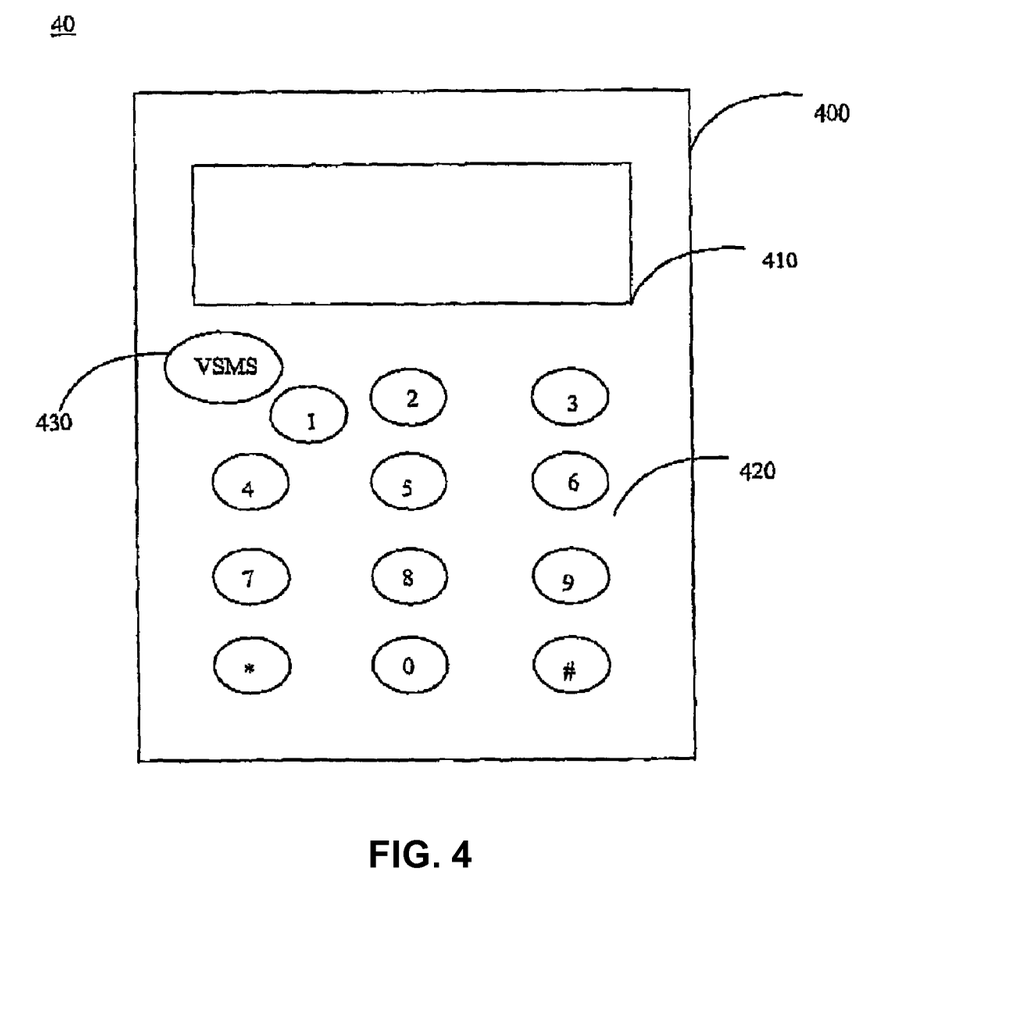
FIG. 4 demonstrates a subscriber terminal 40 in accordance with the invention.

FIG. 4 shows an exemplary embodiment of a subscriber terminal in accordance with the invention. In FIG. 4 the user interface 400 of a preferable subscriber terminal is illustrated. The user interface 400 is typically a PDA and/or a mobile stations front- or backend, or a virtual telephone on a PC screen. In one preferable embodiment, once the VSMS, or any other button or a combination of buttons is pressed, a recording is begun, and the message may be transmitted in accordance with the inventive methods 10, 20 and/or 30. The release of the VSMS button, or any other button or their combination may finish the recording and send the message in accordance with the invention. In some embodiments the buttons may be pressed physically or with a mouse pointer from a screen. In some embodiments separate dedicated keys, combinations of keys, shortcut keys, keyboard accelerators or the like are used to record and deliver messages. In some embodiments, dedicated keys, combinations of keys, shortcut keys, voice recognition keyboard accelerators or the like are used to record and deliver messages specifically to recipients to whom the dedicated keys, combinations of keys, shortcut keys, vocal sound, keyboard accelerators are dedicated to. For example, in one embodiment the button "9" or Ctrl+M could be used to record and deliver the message e.g. to the "M" other of the sender, i.e. mother of the sender. Naturally any other logical relationship between the hot key and the recipient is possible.

In one embodiment the arrival of the message, or a packet stream containing the message may be indicated on the screen 410, or by flashing a light on the VSMS button or any other button or their combination. Once the recipient holds the button down the message is played from the audio devices of the subscriber terminal. In some preferable embodiments the inventive subscriber terminal features also an inbox for arrived messages.

In one embodiment the user interface 400 is the user interface of a mobile station. In one embodiment the method is realized with a computer program that is arranged to run on the SIM card (Subscriber Identity Module) of the mobile station. The SIM card typically bas a CPU, EEPROM-, ROM- and RAM memories. In one phase of this special embodiment the message recipient, several recipients or a group may be chosen from the memory of the SIM card or from the memory of the mobile station, or it is inputted to the mobile station. When a dedicated action, such as pressing a button, is taken, a telephone connection is formed to a messaging server. Then the Caller ID and the telephone numbers of the recipients are transmitted to the messaging server with DTMF tones, SMS, USSD, ISDN d-channel signalling or like signalling. Following this a data file is recorded from the dictation, voice or video that is available through the connection to messaging server. A media player/recorder and/or DSP is typically located on the server and is listening to the telephone connection. After this the message server transfers the file to the recipient, to a secondary address of the recipient or dials the telephone number of the recipient and plays the message as playback to the recipient when the call is answered or to the voicemail box if the call is answered by the voicemail box. Alternatively the server may store the message with the address information in a DBMS or database. The message can then be later sent to at least one recipient. This alternative embodiment is especially suitable when there are separate incoming and outgoing connections. Likewise the file can be transferred to a SFSN, which delivers the message. The dialling of a data or a voice call and transmittance of other information is realised in the terminal 400 using the proactive SIM feature of the SAT SIM Application Toolkit, which is specified in the phase 2+ of the GSM specification in some embodiments.

In some embodiments of the invention, a special prefix and postfix may be stored on the network messaging server, the SIM or the mobile station memory, is played prior and after the recording in the data file to the recipient, respectively. The prefix and/or postfix can be provided by the messaging server, or they can be recorded to the messaging server by the user from the mobile station. The prefix and/or postfix could play for instance: "In the following you will hear a message from Mr. Jero Javenpaa" MESSAGE "This completed the message of Jero Javenpaa." The fact that the message was received could be detected in various ways in accordance with the invention. When the recipient or the voicemail box answers or hangs up, a DTMF tone or a USSD signal may be transmitted by the recipient and detected by the server or the network which may be used to notify the sender or the network that the message was delivered, e.g. with an SMS message of a flash message on the screen. Alternatively the recipient could be asked to press a button or perform a dedicated action in order to signal that the message was indeed received and/or understood. If one or some of the recipients are unavailable, the message may be kept in memory and several other attempts to send the message may be taken. In some embodiments it is possible to set expiration conditions for the message, such as time, demands on memory by other functions, or various other conditions. In some embodiments the SIM, the mobile station, and the messaging server may execute the methods 10, 20, 30 or any permutation of these together, by for example the SIM performing the recipient selection and commands for forming or dialling connection, and the network server by providing a media player.

Figure 5:
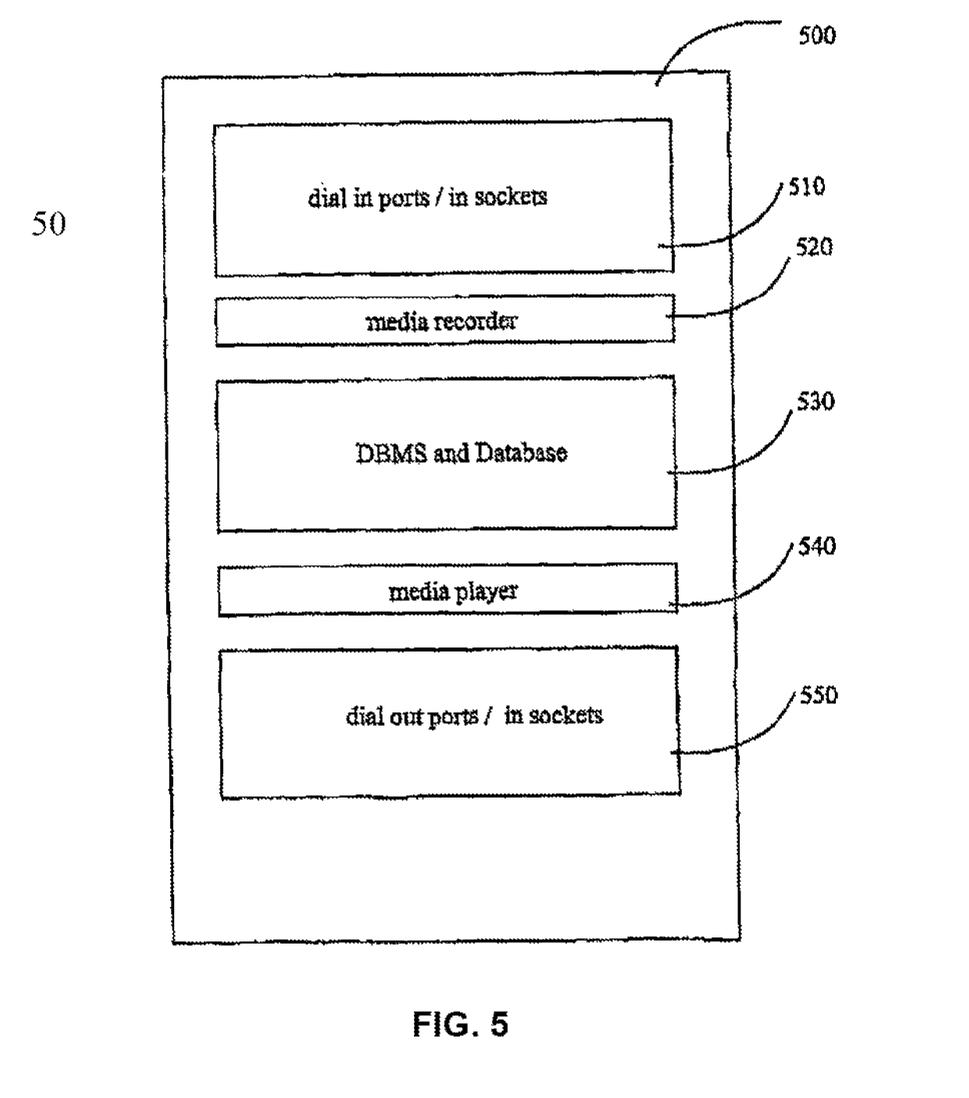
FIG. 5 demonstrates a network server 50 in accordance with the invention.

FIG. 5 exhibits a schematic exemplary embodiment of the messaging server in accordance with the invention. The dial in ports and/or in sockets 510 take the incoming phone calls or other incoming circuit switched or packet switched connections. The media recorder 520 is arranged to record the audio and/or video that comes in through the connections to the ports and sockets 510. The recorder 520 records and digitises the input to a data file, which is typically of MP3-, WAV- or RealSystem Secure, but can be any file format. In alternative embodiments a DSP circuit is interfaced with the media player and the database 530, and this DSP circuit is used to digitise the transmissions and store them to data files. The data file is stored to the database 530. The database can be any database or data management utility, for example Oracle, Solid, TimesTen, Clustra, Informix, Sybase, IBM D2, or any other database or data management system. The database 530 and associated application and management logic analyse the data file and its associated attributes and transfer the file to either a further server in the SFSN, or to the media player 540. For example if a recipient has a foreign country code, the server may relay the file to a SFSN server in that country or near to it. If the recipient is analysed to be in the domain of the server 500, the server uses the dial out ports or out sockets 550 to form a connection to the recipient. When a connection is established, the media player 540 is used to play the message through the connection to the recipient, along with any pre- and/or postfixes assigned by the DBMS or application logic.

In some embodiments the media player 540 and 530 may be integrated. It is clear that both are capable of processing several requests in parallel depending on how many processing requests the server is engaged in.

Low latency is a preferable characteristic of the dial in ports or in sockets. Due to this the server 500 is typically a low latency server, associated closely with network elements. In some preferable embodiments the server is associated with an MSC, BSS, any switching centre or any cellular or fixed telephony network element. In some embodiments the server is persistently distributed over the network that it covers.

Figure 6:
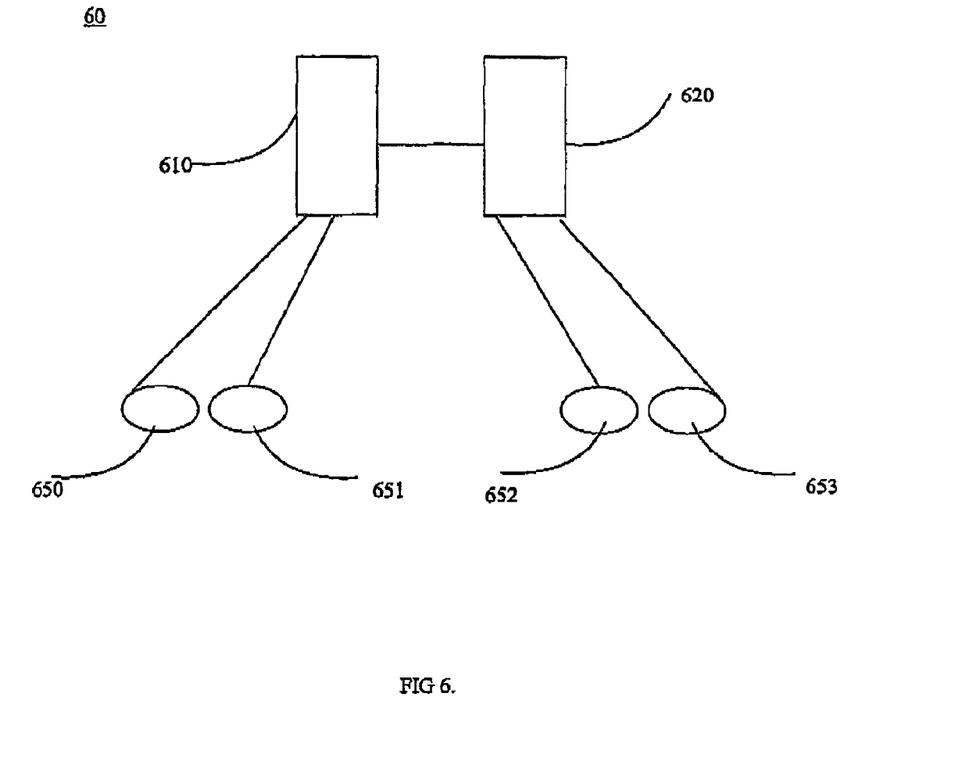
FIG. 6 demonstrates a scalable messaging architecture 60 in accordance with the invention.

FIG. 6 shows schematic miniature network topology in accordance with the invention. The subscriber terminals 650, 651 are in the domain of the server 610, and the terminals 652, 653 are in the domain of server 620. The servers 610 and 620 form a miniature Store and Forward Server Network. Consider a case where a message is placed from the terminal 650 to terminals 652 and 651. In some embodiments the terminal 650 forms a connection to server 610, and the message is recorded to the said server. Server 610 iterates alternatives to deliver the message to both recipients. In some embodiments, it will form a connection to terminal 651 by itself and play the message if the recipient is available. Meanwhile in some embodiments, the server 610 relays a copy of the recorded file to the other server 620 in the SFSN. The file can be relayed by FTP (File Transfer Protocol) or by a traction between databases or by any other data management method. The server 620 then calls the recipient 652 and plays the data file, if the recipient is available.

The subscriber terminals 650, 651, 652, 653 may be any fixed line or wireless device with a telephony or Internet connection. In some embodiments the subscriber terminal is typically a mobile station equipped with an Internet connection and/or a telephony network connection. The mobile station typically abides to UMTS-, GSM-, WAP-, Teldesic-, Inmarsat-, Iridium-, GPRS, CDMA-, HTTP-, H323-, SMS-, MMS-, and/or WCDMA-standards in some preferable embodiments. The subscriber terminal used in the method may also be a PC, PDA Palm Computer or an Apple Macintosh computer equipped with an Internet connection and/or a telephony network connection in some preferable embodiments. The subscriber terminal in accordance with the invention has typically an operating system like Windows-, Windows NT-, Epoc-, Windows CE-, Unix-, Linux-, OS/2, Symbian, Epoc, PalmOS, Pocket PC, GEOS, Ms-Stinger and/or Sybase. The execution of methods 10, 20, 30 is typically realised with a separate software application operating under the control of these operating systems. Alternatively, the execution of methods 10, 20, 30 may be realised with software that is integrated to any of the above operating systems. In some embodiments the execution of methods 10, 20, 30 and their favourable permutations and further embodiments may be realised by OEM software for mobile stations, modems, computers, radio, SIM cards and/or line cards. In some embodiments the execution of methods 10, 20, 30 may be realised with software that is integrated to any email client software, such as Microsoft Outlook, Outlook Express or the like. In some embodiments the execution of methods 10, 20, 30 may be realised with software that is developed using SAT (SIM Application Toolkit) or WTAI (Wireless Telephony Application Interface) of WAP (Wireless Application Protocol).

The servers 610, 620 are typically as described in FIG. 2, except that they may have a separate SFSN data connection between their databases and application logic. In embodiments where some subscribers are wireless, the servers 610, 620, or the SFSN in general may exhibit handover functions.

When a subscriber terminal 650 enters the area where the latency or cost of connection for the server 620 is smaller, it is preferable that it should contact 620 instead. To facilitate these handovers servers 610, 620 may be assigned to different subscribers 650, 651, 652, 653 dynamically during roaming, or later by information derived from the HLR, VLR or any cellular network element that contains the location of the subscriber. The requests for handover may be initiated by the network, the mobile station or both.

The servers 610, 620, and the subscriber terminals 650, 651, 652, 653 may feature transcoders, which may modify the message format from one to the next. For example a message left with a normal phone call could be transcoded into an MMS message. Transcoding between any communication protocols, such as SS7-, GSM-, H323-, HTTP-, GSM-data, IP-RAN-, UMTS-, WAP-, Teldesic, Inmarsat-, Iridium-, GPRS-, CDMA-data-, WCDMA-data-, HTTP-, H323-, SMS, MMS-, USSD-, email-LAN-, TCP/IP-, UDP-, POTS-, NDC-, PDC-, imode-, Globalstar- and/or WLAN-, or file formats, such as MP3, WAV, RealSystem Secure or the like is in accordance with the invention.

Figure 7:
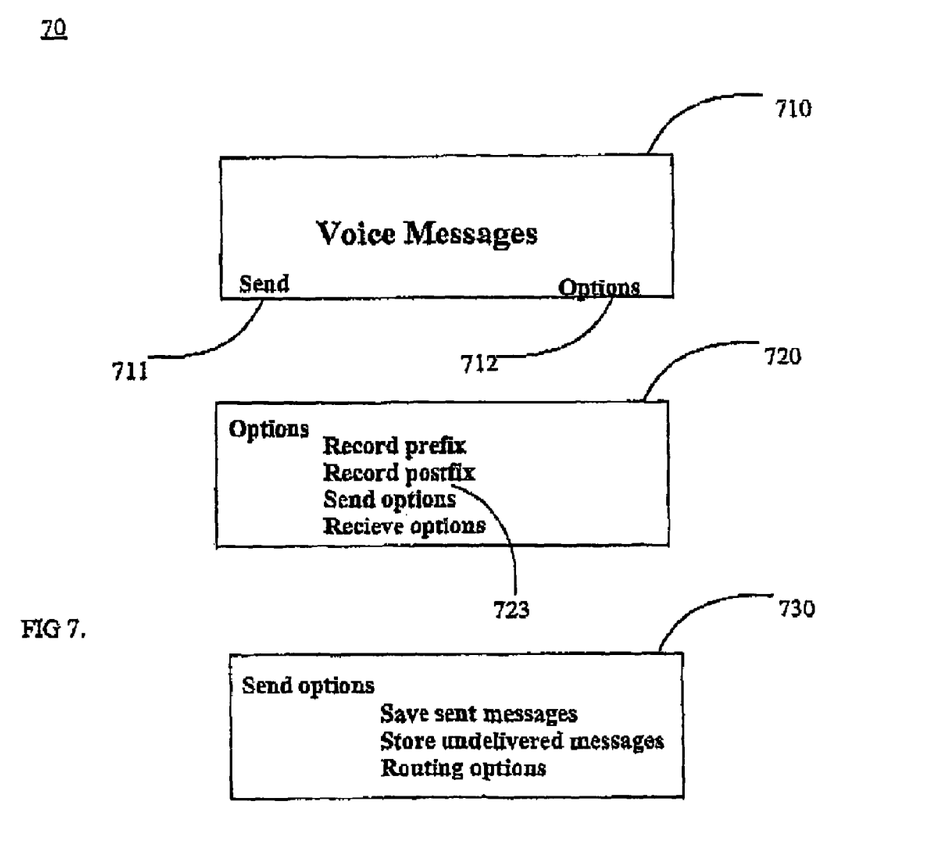
FIG. 7 displays typical screenshots of an exemplary embodiment of the invention.

FIG. 7 displays typical screenshots of an exemplary embodiment of the invention where the subscriber terminal is a mobile station, typically a GSM-CDMA- and/or a WAP mobile station. The main menu item 710 displays "Voice Messages", and is in the main menu of SIM or mobile station operating system software in some embodiments. The main menu item 710 could bear any name e.g. "Instant Voice Message" in accordance with the invention. By choosing 711 "send" the user is directed to the names and telephone numbers directory of the mobile station, which may be stored on the SIM, mobile station memory or network. Once in the directory the user may send a voice message to a recipient, several recipients or a group of recipients by selecting the recipients from the names directory with a dedicated action. Alternatively the user may enter at least one telephone number or other contact directory directly to the mobile station at any stage.

By choosing 712 "options" the user is directed to the Options menu 720. In this menu, the user may record prefixes and postfixes, or alter Send options or Receive options. Send options and receive options may feature saving messages at any stage of methods 10, 20 and/or 30, or preferences concerning alternative routings to alternative directories, such as email addresses, IP addresses or the like.

The inventive method and arrangement 70 is typically realised with WTAI or SIM Application Toolkit (SAT) in some embodiments.

It is possible to exchange methods or means, any parts of the invention, duplicates of the invention, entities composed of the invention or inventive idea to any party in exchange for economic benefit, other benefit, or for no benefit at all.

The invention has been explained above with reference to the aforementioned embodiments and several commercial and industrial advantages have been demonstrated. The inventive methods and means under study allow faster voice messaging and enable similar, but not identical audio/video message "ping ball" as described in the priority document. The sending of voicemail in accordance with the invention is instantaneous and involves no different telephone numbers for the sender to remember. The reception of messages is always instantaneous, provided the recipient is available, and only if not available, may the delivery of the messages be delayed.

The invention has been explained above with reference to the aforementioned embodiments. However, it is clear that the invention is not only restricted to these embodiments, but comprises all possible embodiments within the spirit and scope of the inventive thought and the following patent claims.

What is claimed is:

1. A non-transitory computer-readable medium having instructions stored thereon that, if executed by a server, cause the computing device to perform operations comprising:
   receiving, at the server, at least one contact directory corresponding to a selected message recipient, wherein the at least one contact directory includes primary contact information of the selected message recipient and alternative contact information of the selected message recipient, and wherein the at least one contact directory is received from a mobile subscriber terminal via a packet switched wireless communications connection between the server and the mobile subscriber terminal;
   recording at least one voice/video message to at least one data file, wherein the at least one voice/video message is received from the mobile subscriber terminal;
   disconnecting the packet switched wireless connection;
   communicating the data file to one of a telephony network or an Internet to be relayed to at least one recipient terminal associated with the at least one contact directory; and
   providing a notification to the mobile subscriber terminal, wherein the notification indicates whether the at least one data file was delivered to the at least one recipient terminal.

2. The computer-readable medium of claim 1, wherein said at least one contact directory is any one of a telephone number, ISDN number, URL-address, email, or an IP-address, and wherein recipient contact information in the recipient contact directory is readily and transparently converted from one directory to the next in accordance with message delivery requirements.

3. The computer-readable medium of claim 1, wherein billing for message delivery is realized during any one of before, in between or after any of the steps, and is any one of fixed price, cost per connection minute, or cost per transmitted bit based.

4. The computer-readable medium of claim 1, wherein during, before, in between or after any of the steps, at least one of a sender or the selected message recipient may reply, save or forward messages.

5. The computer-readable medium of claim 1, wherein the mobile subscriber terminal and the server form a Virtual Private Network (VPN).

6. The computer-readable medium of claim 1, wherein undelivered messages are stored at a store and forward server network (SFSN) and wherein any one of attempts to resend at least one message to the selected message recipient or attempts to resend to alternative contact directories of the selected message recipient are made.

7. The computer-readable medium of claim 1, wherein undelivered messages are stored at a store and forward server network (SFSN) for a given time, after which they are deleted.

8. A non-transitory computer-readable medium having instructions stored thereon that, if executed by a server, cause the computing device to perform operations comprising:
   receiving, at the server, at least one contact directory corresponding to a selected message recipient, wherein the at least one contact directory includes primary contact information of the selected message recipient and alternative contact information of the selected message recipient, and wherein the at least one contact directory is received from a mobile subscriber terminal via at least one packet switched wireless communications connection between the server and the mobile subscriber terminal;

recording at least one voice/video message to at least one data file on said server, wherein the at least one voice/video message is received from the mobile subscriber terminal via said at least one packet switched wireless communications connection;

communicating the at least one data file to a Store and Forward Server Network (SFSN) for relaying of said at least one data file to at least one recipient terminal device associated with the at least one contact directory; and providing a notification to the mobile subscriber terminal, wherein the notification indicates whether the at least one data file was delivered to the at least one recipient terminal device.

9. The computer-readable medium of claim 8, wherein communications connections used between said mobile subscriber terminal and the SFSN are any one of dial connections, data connections or packet switched connections, compliant with: SS7-, GSM-, H323-, HTTP-, GSM-data, IP-RAN-, UMTS-, WAP-, Teldesic-, Inmarsat-, Iridium-, GPRS-, CDMA-data-, WCDMA-data-, SMS-, MMS-, USSD-, email-LAN-, TCP/IP-, UDP-, POTS-, NDC-, PDC-, imode-, Globalstar- or WLAN-connections.

10. The computer-readable medium of claim 8, wherein undelivered messages are stored at the SFSN, and any one of attempts to resend said at least one data file to said selected message recipient or attempts to resend to alternative contact directories of said selected message recipient are made.

11. The computer-readable medium of claim 8, wherein undelivered messages are stored at the SFSN for a given time, after which they are deleted.

12. The computer-readable medium of claim 8, wherein the at least one contact directory is any one of a telephone number, ISDN number, URL-address, email, or IP-address, and wherein the at least one contact directory is readily and transparently converted from one directory to the next in accordance with message delivery requirements.

13. The computer-readable medium of claim 8, wherein billing for message delivery is realized during any one of before, in between or after any of the steps, and is fixed price, cost per connection minute, or cost per transmitted bit based.

14. The computer-readable medium of claim 8, wherein during, before, in between or after any of the steps, any one of a sender or the selected message recipient may reply, save or forward messages.

15. The computer-readable medium of claim 8, wherein communications connections used between the mobile subscriber terminal, the server, and the SFSN are any one of dial connections, data connections or packet switched connections, compliant with any one of:

SS7-, GSM-, H323, HTTP-, GSM-data, IP-RAN-, UMTS-, WAP-, Teldesic-, Inmarsat-, Iridium, GPRS-, CDMA-data-, WCDMA-data-, SMS-, MMS-, USSD-, email-LAN-, TCP/IP-, UDP-, POTS-, NDC-, PDC-, imode-, Globalstar- or WLAN-connections.

16. The computer-readable medium of claim 8, wherein the mobile subscriber terminal and the server form a Virtual Private Network (VPN).

\* \* \* \* \*

UNITED STATES PATENT AND TRADEMARK OFFICE
CERTIFICATE OF CORRECTION

| | | |
|---|---|---|
| PATENT NO. | : 8,611,863 B2 | Page 1 of 1 |
| APPLICATION NO. | : 13/161887 | |
| DATED | : December 17, 2013 | |
| INVENTOR(S) | : Väänänen | |

It is certified that error appears in the above-identified patent and that said Letters Patent is hereby corrected as shown below:

On the Title Page, Item (63), under "Related U.S. Application Data", in Column 1, Line 2, delete "Pat. No. Re. 42.476." and insert -- Pat. No. Re. 42,476, which is a Reissue of U.S. application Ser. No., 10/344,994, filed Jul. 10, 2003, now Pat No. 7,113,767, which is a National Stage of PCT/FI2001/000732, filed Aug. 20, 2001. --, therefor.

On the Title Page, Item (51), under "Int. Cl.", in Column 1, Line 2, insert -- H04H 1/64 --.

On Title Page 2, Item (56), under "OTHER PUBLICATIONS", in Column 2, Line 40, delete "Resont," and insert -- Reston, --, therefor.

In the Drawings

In Fig. 2, Sheet 2 of 7, delete "FIG 2." and insert -- FIG. 2 --, therefor.

In Fig. 3, Sheet 3 of 7, delete "FIG 3." and insert -- FIG. 3 --, therefor.

In Fig. 6, Sheet 6 of 7, delete "FIG 6." and insert -- FIG. 6 --, therefor.

In Fig. 7, Sheet 7 of 7, delete "FIG 7." and insert -- FIG. 7 --, therefor.

In the Specification

In Column 2, Lines 53-54, delete the extra space between "connection," and "transferring".

In Column 2, Line 61, delete "network," and insert -- network. --, therefor.

In the Claims

In Column 16, Line 22, in Claim 15, delete "H323," and insert -- H323-, --, therefor.

In Column 16, Line 23, in Claim 15, delete "Iridium," and insert -- Iridium-, --, therefor.

Signed and Sealed this
Third Day of June, 2014

Michelle K. Lee
*Deputy Director of the United States Patent and Trademark Office*